(No Model.) 2 Sheets—Sheet 1.
J. C. DEVLIN.
CAR BRAKE.
No. 574,787. Patented Jan. 5, 1897.
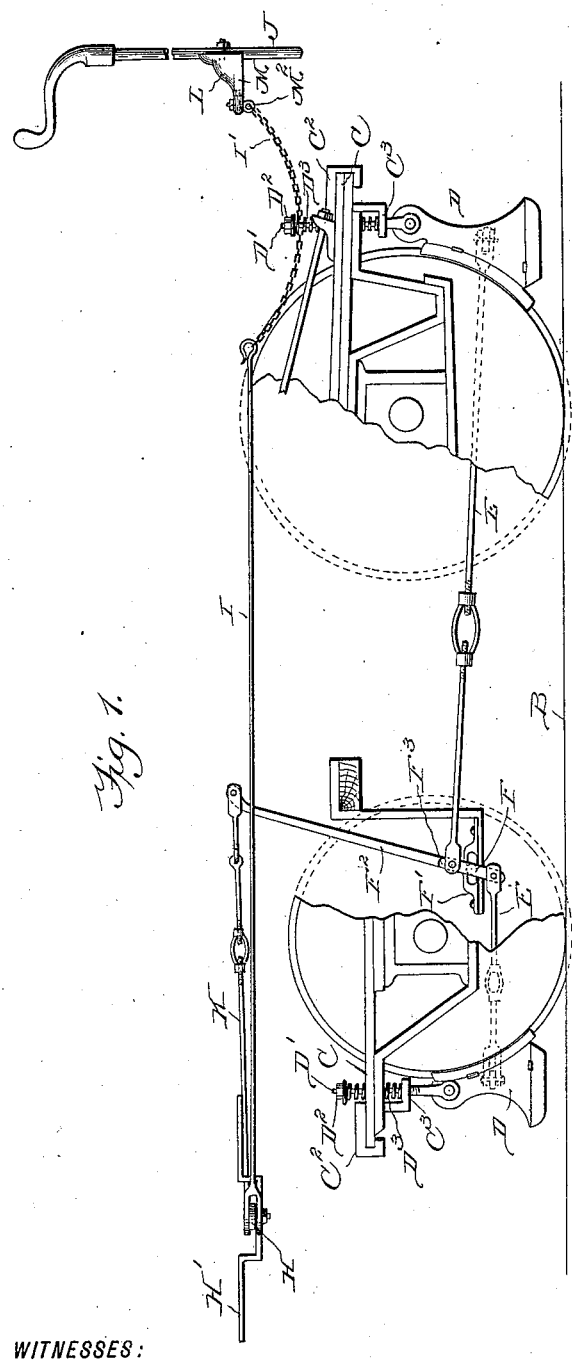
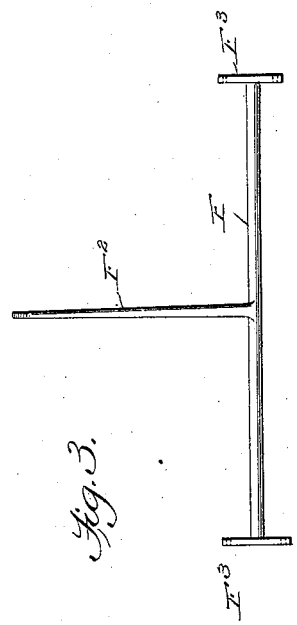
WITNESSES:
Harry S. Rohrer
L. D. Hinrichs
INVENTOR
James C. Devlin
BY
Wallace Greene
ATTORNEY.

(No Model.) 2 Sheets—Sheet 2.
J. C. DEVLIN.
CAR BRAKE.
No. 574,787. Patented Jan. 5, 1897.
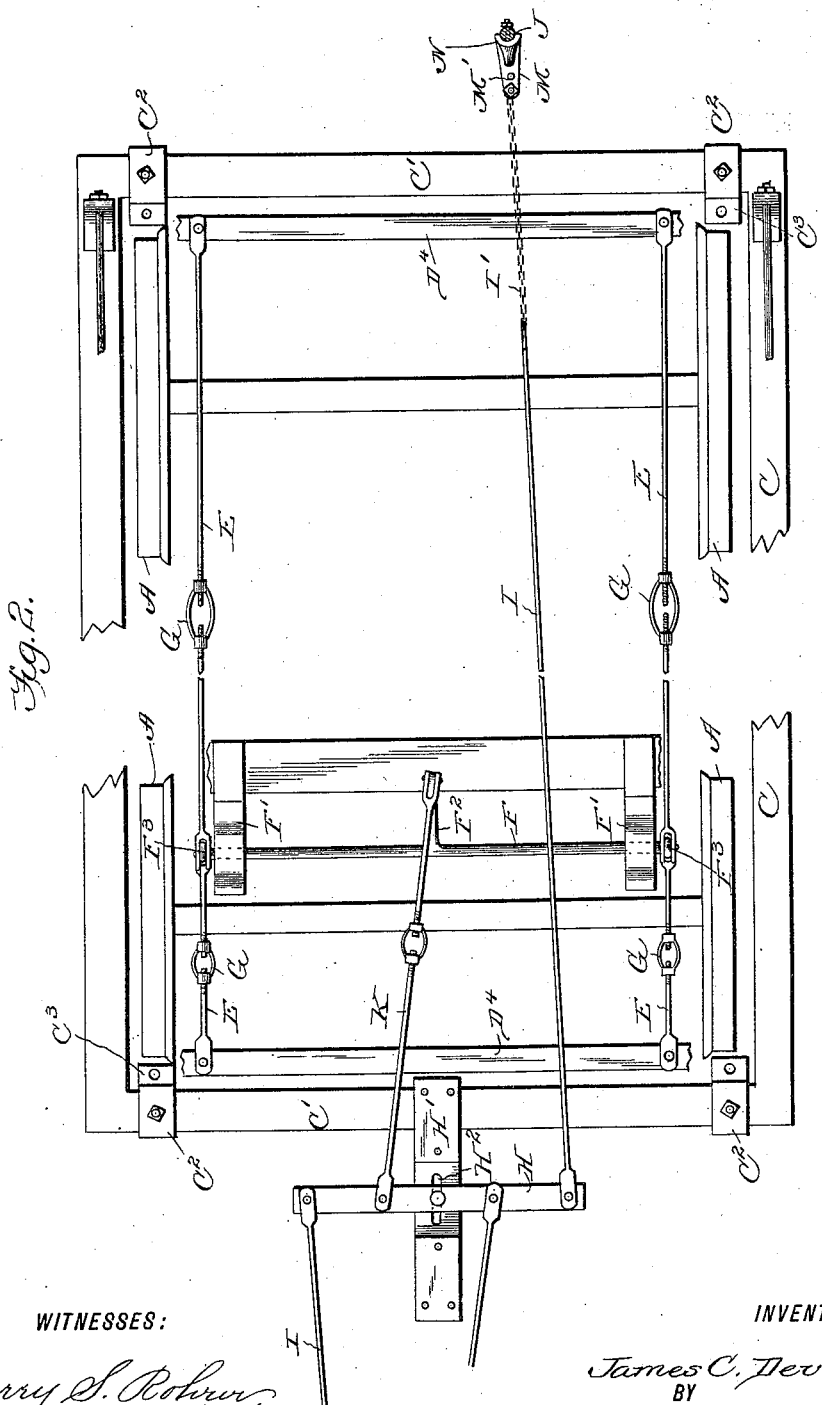
WITNESSES:
Harry S. Rohrer
L. D. Hinrichs
INVENTOR
James C. Devlin
BY
Wallace Greene
ATTORNEY.
THE NORRIS PETERS CO., PHOTO-LITHO., WASHINGTON, D. C.

UNITED STATES PATENT OFFICE.

JAMES C. DEVLIN, OF HERNANDO, MISSISSIPPI.

CAR-BRAKE.

SPECIFICATION forming part of Letters Patent No. 574,787, dated January 5, 1897.

Application filed July 2, 1896. Serial No. 597,815. (No model.)

*To all whom it may concern:*

Be it known that I, JAMES C. DEVLIN, a citizen of the United States, residing at Hernando, in the county of De Soto and State of Mississippi, have invented certain new and useful Improvements in Car-Brakes; and I do hereby declare the following to be a full, clear, and exact description of the invention, such as will enable others skilled in the art to which it appertains to make and use the same.

This invention relates to improvements in brakes, and especially to the means for simultaneously applying brakes with equal force to each of the eight wheels of railway-cars and the larger of ordinary street-cars such as are now commonly used on rapid-transit lines. With cars of these classes there must be "slack" in the operating mechanism in order that the car may pass around curves without bringing the brakes in contact with the wheels, and in applying the brakes this slack must be taken up before the brake begins to act. Where a hand-rotated brake-staff is used, the operator must give this staff three or three and a half turns for this purpose. To avoid this necessity without diminishing the braking power, whatever the slack, is one object of this invention. To insure uniform brake-pressure upon each of the wheels by simple means is a second object. The brakes acting upon the eight wheels are all operated from either end of the car, and as the devices for the two sets of four wheels forming the truck are precisely similar only one set of the duplicate devices is shown.

In the drawings, Figure 1 is a side elevation of the brakes and brake-operating devices of one truck, the truck itself being for the most part omitted. Fig. 2 is a plan view of the same devices. Fig. 3 is a detail view of a certain rock-shaft and its arms.

In all the drawings where the letters occur, A A' are car-wheels resting upon rails B.

C is the truck-frame, projecting beyond the wheels and supporting a combined wheel and track brake D, without novelty herein claimed. The truck-frame has transverse members C', and upon each of these are detachably bolted two stirrups C², having a horizontal member C³ at some distance below the member C' and projecting toward the wheel therefrom.

To the brakes D are pivoted rods D', which pass up through the members C³ and have upon their threaded terminal portions nuts D², which rest upon springs D³, supported upon the members C³. The brakes are thus supported wholly by the springs, and the force needed to cause their descent to the track may be varied at will by turning the nuts D². Just within the planes of the wheels upon each side are rods E, pivoted to the brake-beam D⁴ and extending toward the center of the truck. At a suitable point between the two brakes a transverse rock-shaft F is mounted in steel bearing-blocks F', rigidly supported from the truck-frame. The shaft-bearing in these blocks is a broad slot, allowing the shaft no vertical motion, but permitting it to move bodily toward either brake. Near the middle of the rock-shaft is a rigid arm F², extending obliquely upward, and at the ends of the shaft are similarly-inclined short rigid T-bars F³. To the lower ends of the T-bars, respectively, are pivoted the rods coming from one brake-beam, and to their upper ends the rods from the other beam are connected in like manner. All the four rods are preferably provided with turnbuckles G.

Beneath the middle portion of the car is a transverse bar H, centrally pivoted to a suitable bracket H', adapted to be supported from the car itself. The central pivot passes down through a longitudinal slot H² in the bracket, and the bar is thus mounted to move bodily toward either end of the car. From the ends of the bar rods I run, respectively, to brake-staffs J at the ends of the car. Upon each side of the bracket a rod K is pivoted to the bar and pivotally connected at its other end to the upper end of the corresponding rock-shaft arm F². Each rod K is provided with a turnbuckle, by which its length may be accurately adjusted.

As is usual, the rods I are each connected to the brake-staff by a short chain, but in this case the connection is not direct. A casting L rests like a half-sleeve against the staff at some distance from its lower end and is secured by a rigid bolt projecting from the casting through the staff and bearing a nut upon its threaded end. The bolt is nearly midway between the top and bottom of the casting, so that the casting may compensate the weakening due to perforating the staff. From the lower part of the casting projects an arm M, provided with a series of perforations M' to receive an eyebolt M². To this eyebolt the end of the rod I is connected by a chain I'. Evidently when the arm is in a line with the rod I and extending toward it a half-revolution of the staff shortens the chain by an amount equal to twice the distance of the eyebolt from the center of the shaft, and this distance is greater or less according as the eyebolt is placed in one or the other of the perforations. Slack is taken up by such half-revolution, and further rotation will then wind the chain upon the staff in precisely the usual manner and with the usual force. In practice with cars now in daily use this device saves two turns of the staff.

By giving the rock-shaft the sliding bearing already described, should either of the shoes seen in Fig. 1 meet its wheel in advance of the other, instead of all the force being expended upon one wheel this end of the shaft slides until the other shoe also meets its wheel, and the same force is exerted upon each wheel. At the other side of the car the result is the same, whether the rock-shaft must slide in the same or the contrary direction. If, however, no other equalizing devices were provided, it might happen that the brakes upon these four wheels would act, while the brakes upon the other four would not come into action. The bar H is therefore arranged as set forth, and hence it may be swung about the pivot of either rod K until the strain upon the two rods, and hence upon the brakes of the two sets of trucks, is the same.

What I claim is—

1. The combination with a four-wheeled truck having brakes adapted to move horizontally against each of the wheels, of a transverse rock-shaft mounted in bearings adapted to permit bodily lateral movement and provided with suitable rigid arms, near each end, rods connecting the arms at each end, respectively, to the brakes swinging against the corresponding wheels, and means for rocking said rock-shaft.

2. The combination with two four-wheeled trucks each having brakes acting upon each wheel, of a lever centrally pivoted between the trucks and movable bodily toward either, two transverse rock-shafts lying, one in each truck, between the pairs of wheels and mounted in bearings permitting either end to move toward either pair, devices connecting the arms of said lever to the rock-shafts, each to each, to operate the latter, and devices connecting each end of each rock-shaft to the brakes acting upon the adjacent wheels.

3. The combination with the truck having brakes arranged for pressing the wheels, respectively, of a rock-shaft supported in bearings permitting bodily lateral movement and provided with rigid end arms and with a rigid central arm, devices connecting said end arms, respectively, to the corresponding brakes, and devices connecting the free end of the central arm to brake-operating mechanism.

4. The combination with two sets of trucks each provided with brakes for each wheel and with a transverse rock-shaft connected to its several brakes to operate them by its rotary motion, of a lever arranged, between the sets, for bodily movement toward either, devices connecting the lever-arms, respectively, to the corresponding rock-shafts to operate them, and means for forcing one lever-arm toward one of said sets.

In testimony whereof I affix my signature in presence of two witnesses.

JAMES C. DEVLIN.

Witnesses:
WALLACE GREENE,
H. M. STERLING.